United States Patent
Lee

(10) Patent No.: US 6,624,869 B2
(45) Date of Patent: Sep. 23, 2003

(54) IN-PLANE SWITCHING TYPE LIQUID CRYSTAL DISPLAY DEVICE WITH CENTRAL COMMON FEED LINE AND A METHOD FOR MANUFACTURING THE SAME

(75) Inventor: Jung-Hoo Lee, Yongin-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 42 days.

(21) Appl. No.: 09/837,375

(22) Filed: Apr. 19, 2001

(65) Prior Publication Data
US 2002/0044227 A1 Apr. 18, 2002

(30) Foreign Application Priority Data
Oct. 14, 2000 (KR) .......................... 2000-60539

(51) Int. Cl.$^7$ ............................................ G02F 1/1345
(52) U.S. Cl. ....................................................... 349/149
(58) Field of Search .................................. 349/141, 149

(56) References Cited

U.S. PATENT DOCUMENTS 5,598,285 A * 1/1997 Kondo et al. ................ 349/39
5,852,485 A * 12/1998 Shimada et al. ............ 349/141
6,215,541 B1 * 4/2001 Song et al. .................. 349/141

* cited by examiner

Primary Examiner—Robert H. Kim
Assistant Examiner—T. L. Rude
(74) Attorney, Agent, or Firm—McGuireWoods LLP

(57) ABSTRACT

An in-plane switching type liquid crystal display device includes a common electrode connector disposed in a longitudinal direction respectively at a center portion and both sides of the pixel region to supply a common voltage to common electrodes. Data lines positioned at the left of the center-positioned common electrode connector are disposed respectively at the left of corresponding pixels positioned at the left of the center-common electrode connector, whereas data lines positioned at the right of the center-common electrode connector are disposed respectively at the right of corresponding pixels positioned at the right of the center-positioned common electrode connector in order to provide a space required to dispose the center-positioned common electrode connector. Accordingly, all pixels in pixel area are arranged to have a symmetrical figure with respect to the center-common electrode connector.

12 Claims, 6 Drawing Sheets

IN-PLANE SWITCHING TYPE LIQUID CRYSTAL DISPLAY DEVICE WITH CENTRAL COMMON FEED LINE AND A METHOD FOR MANUFACTURING THE SAME

FIELD OF THE INVENTION

The present invention relates to a liquid crystal display (LCD) device and a method for manufacturing the same, and more particularly to an in-plane switching type or a lateral electric field type liquid crystal display device and the method for manufacturing the same.

BACKGROUND OF THE INVENTION

A commonly used thin film transistor liquid crystal display device includes a substrate having a plurality of pixel electrodes, an opposite substrate having common electrodes, and a liquid crystal material therebetween. On one of the substrates, a plurality of switching elements, each of which is disposed in a pixel, are disposed to control electric fields which are imparted to the liquid crystal material. An example of switching elements is a metal oxide silicon transistor having a gate electrode, a source electrode, and a drain electrode. The gate electrode receives gate voltages from the gate lines that are arranged on the substrate in a transverse direction. The source electrode is connected to one of data lines crossing the gate lines, which are arranged in a longitudinal direction. The drain electrode extends to form one of the pixel electrodes. When the pixel electrodes and the common electrodes receive voltages by the operation of the corresponding switching elements, the molecules of the liquid crystal material change their orientations in response to the electric fields generated by the potential difference between the pixel electrodes and the common electrodes. The liquid crystal material of the LCD shields or passes light according to the alignment of the liquid crystal molecules to display images.

However, the conventional LCD has a narrow viewing angle which requires selective viewing directions. In order to obtain a wide viewing angle, in-plane switching (IPS) type LCDs are suggested. An example of an IPS LCD is disclosed in U.S. Pat. No. 5,907,379. The IPS LCD has pixel and common electrodes formed on only one substrate. As shown in FIG. 1, the pixel electrodes and the common electrodes are disposed alternately in a transverse direction in each pixel so that when the pixel and common electrodes are applied with voltages, a liquid crystal material can be arranged parallel to a substrate.

Referring now to FIG. 1, the pixel electrode aligned in a longitudinal direction has two pixel electrode bars 13 and 13' every pixel. Two pixel electrode bars 13 and 13' are parallel to common electrode bars 21, 21' and 21" of the common electrode 20, and each pixel electrode bar 13 or 13' is arranged between two of the common electrode bars 21, 21' and 21". Upper ends of the pixel electrode bars 13 and 13' are electrically connected to each other by an upper connecting member 15, whereas lower ends of the pixel electrode bars 13 and 13' are electrically connected to each other by a lower connecting member 17. Thus, the upper connecting member 15 and the lower connecting member 17 along with two pixel electrode bars 13 and 13' form a rectangular shape.

The common electrode 20 has three common electrode bars 21, 21' and 21" aligned in the longitudinal direction of each pixel. Upper portion and lower portion of the common electrode bars 21, 21' and 21" are interconnected respectively by upper common electrode line 23 and lower common electrode line 23' to be electrically connected to each other. The common electrode 20 including upper common electrode line 23 and lower common electrode lines 23' is extended in the entire pixel area as well as in each pixel, as shown in FIG. 2.

FIG. 2 shows an electric connecting layout of common electrodes 20 on a substrate of a conventional IPS LCD. The common electrodes 20 of the IPS LCD are arranged parallel to gate lines 40. It is noted that in FIG. 2, the common electrodes 20 are illustrated as lines, but each of them has a ladder shape having a plurality of common electrode bars 21,21' and 21" and common electrode lines 23 and 23' connecting the common electrode bars 21, 21' and 21" in the transverse direction.

In order to make the common electrode bars 21,21' and 21" in each pixel to receive the same voltages, it is necessary to connect all common electrode bars 21, 21' and 21" in the longitudinal direction as well as in the transverse direction. For this purpose, a common shorting bar 31 or 33 is arranged parallel to data lines 50 in the longitudinal direction to be electrically connected with the common electrodes 20. Accordingly, even though the common shorting bars 31 or 33 supply only one end of each common electrode line or bar with common voltages, the common electrode 20 in each pixel also can be applied with the same common voltages as supplied to one end of each common electrode line or bar since the common electrode bars 21, 21' and 21" are interconnected by the common electrode lines 23 and 23'.

However, in case only one common shorting bar 31 or 33 is used, common voltages supplied to the common electrode bars 21,21' and 21" in pixels remote from the common shorting bar 31 or 33 are lower than the required voltages since each common electrode line 23 or 23' has the line resistance. The voltage drop in pixels remote from the common shorting bar 31 or 33 causes a flicker or a crosstalk, and thereby results in a deteriorated image quality of the LCD.

To solve the problem, it can be considered to increase width of the common electrode lines. However, it may decrease an aperture ratio and require additional space to dispose the enlarged common electrode lines.

As another method to solve the problems, it can be also considered to dispose a common shorting bar every pixel row. However, an additional process for forming common shorting bars on a substrate may increase the product cost. Also, the aperture ratio still may be decreased and an additional space may be required for the enlarged common electrode lines.

To solve the above problems and supply effectively each common electrode with common voltage, a widely-used structure disposes common shorting bars 31 and 33 at both sides of a pixel area of the LCD, as shown in FIG. 2. However, since a large size and a high definition LCD may render a very large voltage difference between a center portion and a peripheral portion of the pixel area, such structure may also cause a flicker or a crosstalk due to the voltage instability, resulting in a deteriorated image quality of the LCD.

SUMMARY OF THE INVENTION

It is an object of the present invention to provide an in-plane switching type thin film transistor liquid crystal display device and a method for manufacturing the same that can effectively prevent common voltage drop at each pixel of a pixel area to improve the image quality of the LCD.

It is another object of the present invention to provide an in-plane switching type thin film transistor liquid crystal display device and a method for manufacturing the same that can improve the distribution of common voltages in a pixel area without an additional process and decrease in an aperture ratio It is other object of the present invention to provide an in-plane switching type thin film transistor liquid crystal display device and a method for manufacturing the same that are adapted to use in a large size and a high definition LCD.

These and other objects are provided, according to the present invention, by an in-plane switching type liquid crystal display device comprising a substrate, a liquid crystal material layer, pixel electrodes, common electrodes, gate lines, and data lines. The liquid crystal display device has common electrode lines connecting common electrode bars in the transverse direction to supply common voltages thereto and common shorting bars arranged parallel to the data lines to be electrically connected to the common electrodes to supply common voltages thereto.

In a preferred embodiment of the invention, the liquid crystal display device includes a plurality of thin film transistors, each of which is disposed in a pixel, and three common shorting bars. The common shorting bars are disposed in a longitudinal direction respectively at a center portion and both sides of a pixel area to supply the common electrodes with common voltage. Preferably, data lines positioned at the left of the center-positioned common shorting bar are disposed respectively at the left of corresponding pixels positioned at the left of the center-positioned common shorting bar, and data lines positioned at the right of the center-positioned common shorting bar are disposed respectively at the right of corresponding pixels positioned at the right of the center-positioned common shorting bar in order to provide a space required to dispose the center-positioned common shorting bar. Thus, a center space formed by changing the position of the data lines allows the center-positioned common shorting bar to be easily arranged at the center of the pixel area without an additional space and decrease of an aperture ratio.

Also, it is preferable that the common shorting bars are formed of metal having a conductivity higher than that of a doped semiconductor layer and, if possible, wider. Preferably, both ends of the common shorting bars are connected respectively to common voltage pads of the source driving integrated circuit to reduce voltage drop due to the line resistance of the common shorting bar itself.

Also, each end of the center-positioned shorting bar can be connected to two common voltage pads of the source driving integrated circuit to increase a redundancy, thereby improving reliance of the LCD.

According to the present invention, the method for manufacturing a in-plane switching type thin film transistor liquid crystal display device comprises the steps of forming a first conductive layer on a substrate, forming gate lines and common electrode lines by patterning the first conductive layer, forming a gate insulating layer on the substrate on which the gate lines and common electrode lines are formed, forming a semiconductor layer on the substrate on which the gate insulating layer is formed, forming an active region by patterning the semiconductor layer, forming a second conductive layer on the substrate on which the active region is formed, forming a plurality of thin film transistors, each of which has a source and a drain electrode, pixel electrodes connected to the drain electrodes, and data lines connected to source electrodes by patterning the second conductive layer on the substrate, forming a protecting layer on the substrate on which the data lines are formed, forming contact holes to expose a center portion and both ends of each common electrode, forming a third conductive layer on the substrate on which the contact holes are formed, and forming common shorting bars parallel to the data lines at a center portion and both sides of a pixel area by patterning the third conductive layer. The common shorting bars are electrically connected to the center portion and both ends of each common electrode on which the contact holes are formed.

In the method of the present invention, the step of forming the active region further includes forming a doped semiconductor layer on the substrate on which the semiconductor layer is formed, and the doped semiconductor layer is patterned along with the semiconductor layer.

In addition, the step of forming the thin film transistors includes separating electrically the source electrodes from the drain electrodes by patterning the doped semiconductor layer along with the second conductive layer.

Also, the step of forming the data lines includes forming common shorting bars composed of the same material as the data lines at the center portion and both sides of the pixel area, the step of forming the contact holes includes exposing portions of each common shorting bar of the same material as the data lines with which the center portion and both ends of each common electrode are to be electrically connected, and the step of forming the common shorting bars by patterning the third conductive layer includes making the center portion and both ends of each common electrode to be connected to the portions of each common shorting bar of the same material as the data lines.

DETAILED DESCRIPTION OF PREFERRED EMBODIMENTS

The present invention now will be described more fully hereinafter with reference to the accompanying drawings, in which preferred embodiment of the invention is shown. This invention may, however, be embodied in many different forms and should not be construed as limited to the embodiment set forth herein. Like numbers refer to like elements throughout.

Figure 1:
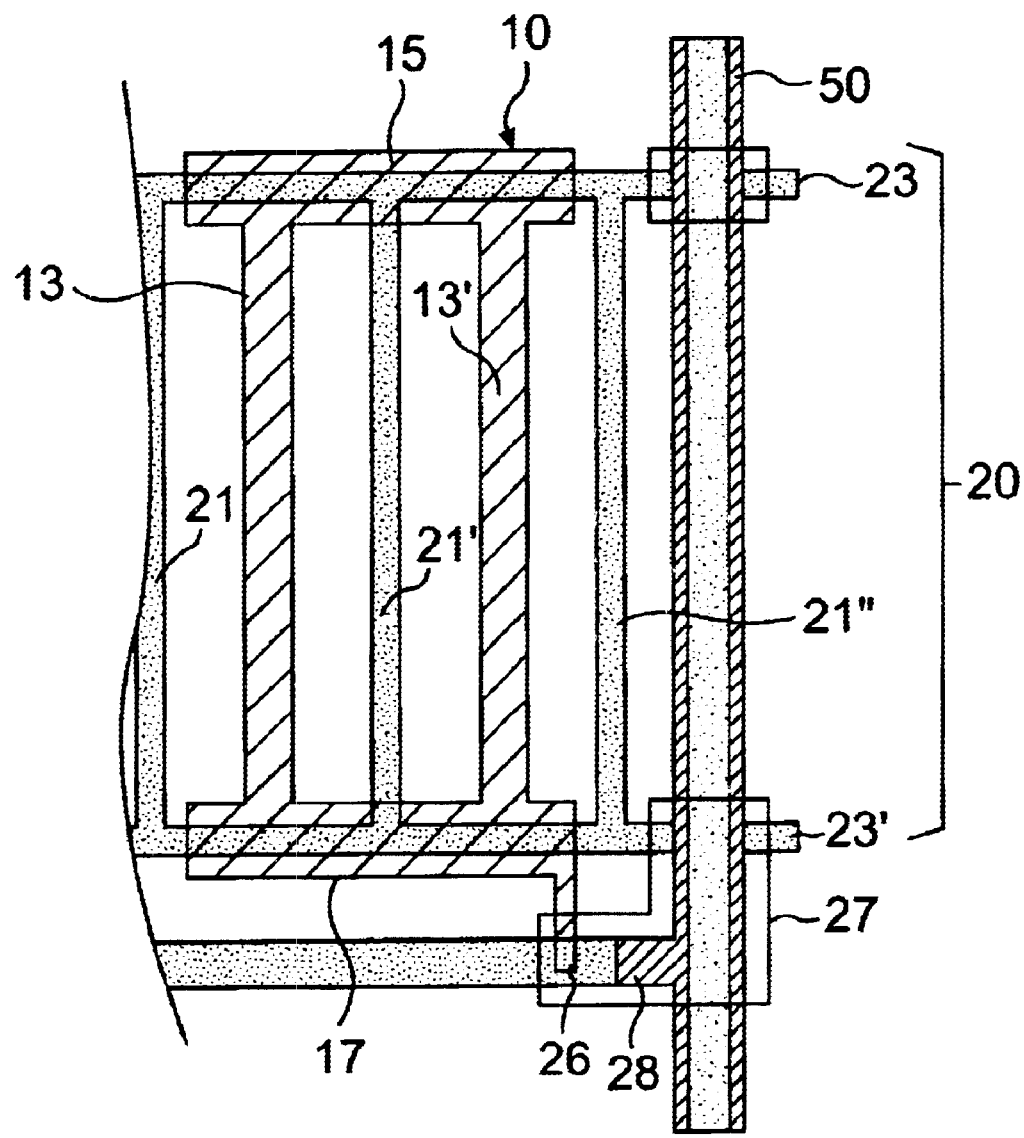
FIG. 1 is a top plan view illustrating an electrode structure in a pixel of a general in-plane switching type liquid crystal display device.
Figure 2:
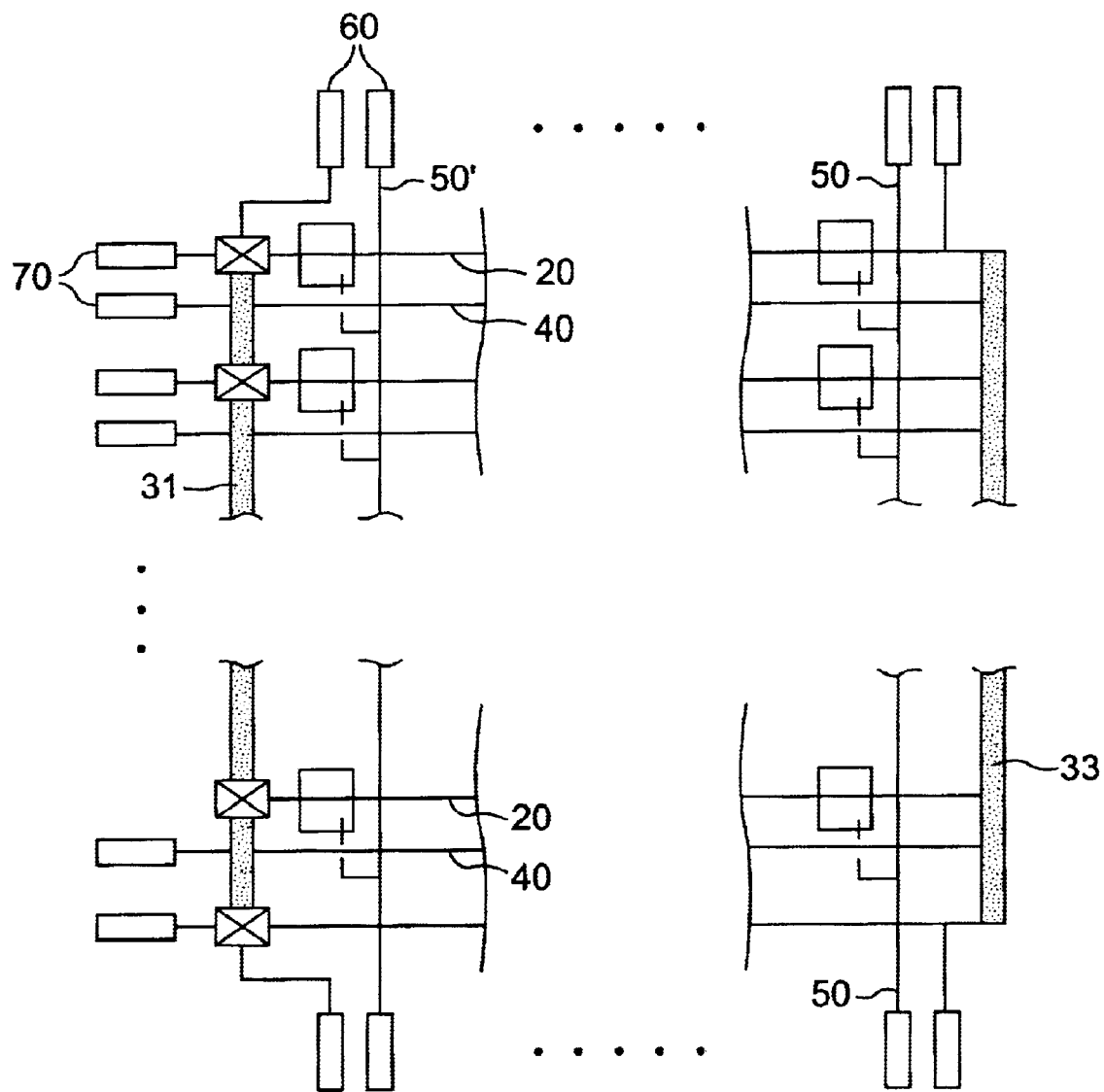
FIG. 2 is an electric connecting layout view of a substrate of a conventional in-plane switching type liquid crystal display device.
Figure 3:
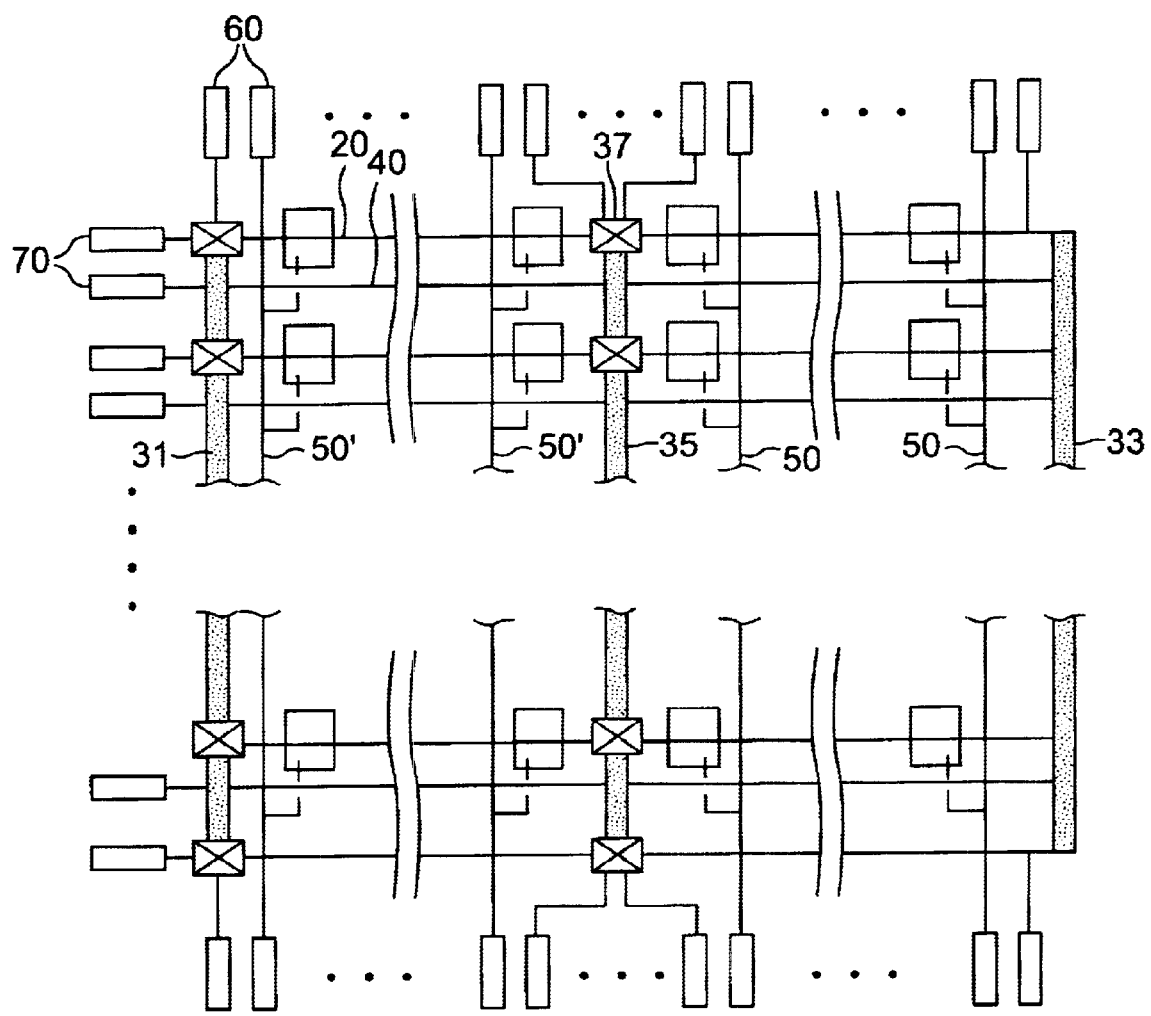
FIG. 3 is an electric connecting layout view of a substrate of an in-plane switching type liquid crystal display device in accordance with the present invention.

FIG. 3 is an electric connecting layout view of a substrate of an in-plane switching type liquid crystal display device in accordance with the present invention. It is noted that in FIG. 3, common electrodes 20 are illustrated as lines, but each of them has a ladder shape having a plurality of common electrode bars 21, 21' and 21" and common electrode lines 23 and 23' connecting the common electrode bars 21, 21' and 21" in the transverse direction. The common electrodes 20 and gate lines 40 are connected with common voltage pads 70 of the gate driving integrated circuit at their ends. Upper end and lower end of each data line 50 or 50' are also connected to upper and lower common voltage pads 60 of the source driving integrated circuit, respectively. In order to make the common electrode bars 21, 21' and 21" in each pixel to receive the same voltages, all common electrodes 20 are connected in a longitudinal direction by a common shorting bar 35 which is disposed at the center portion of a pixel area of the LCD. The common shorting bar 35 is arranged parallel to the data lines 50 and 50' in the longitudinal direction to be electrically connected to the common electrodes 20. Upper and lower ends of the common shorting bar 35 are connected to upper and lower common voltage pads 60 of the source driving integrated circuit, respectively. Also, other common shorting bars 31 and 33 arranged parallel to the data lines 50 and 50' in the longitudinal direction and electrically connected to the common electrodes 20 are disposed at both sides of the pixel area of the LCD, as shown in a conventional IPS LCD of FIG. 2.

Accordingly, when the common shorting bars 31,33 and 35 supply each common electrode 20 with common voltages, all common electrodes 20 in the pixel area can receive the same common voltages as supplied by the common shorting bars 31,33, 35 since the common shorting bars 31,33, 35 are connected with a center portion as well as both ends of each common electrode 20.

Figure 4:
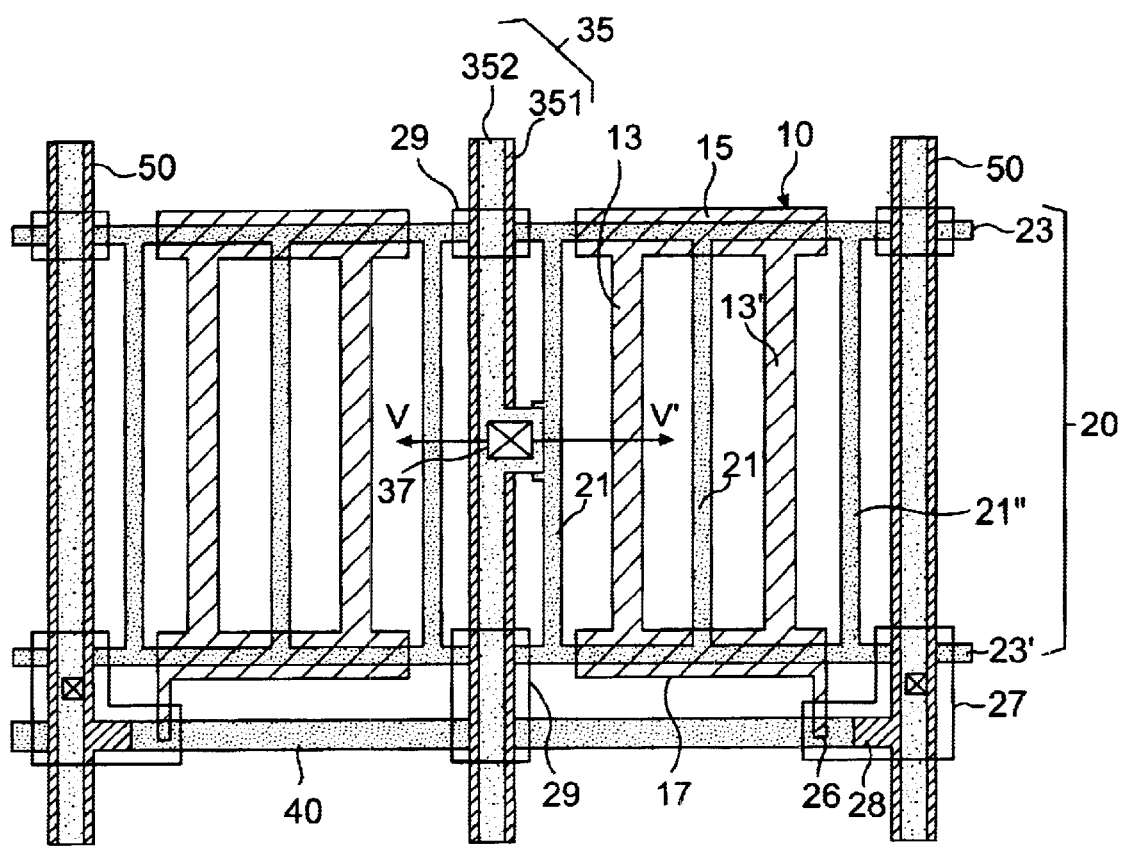
FIG. 4 is a partial top plan view of an in-plane switching type liquid crystal display device in accordance with the present invention in which a common shorting bar is disposed at a center portion of a pixel area.

FIG. 4 is a partial top plan view of the in-plane switching type liquid crystal display device in accordance with the present invention in which a common shorting bar 35 is disposed at the center portion of a pixel area.

Figure 5:
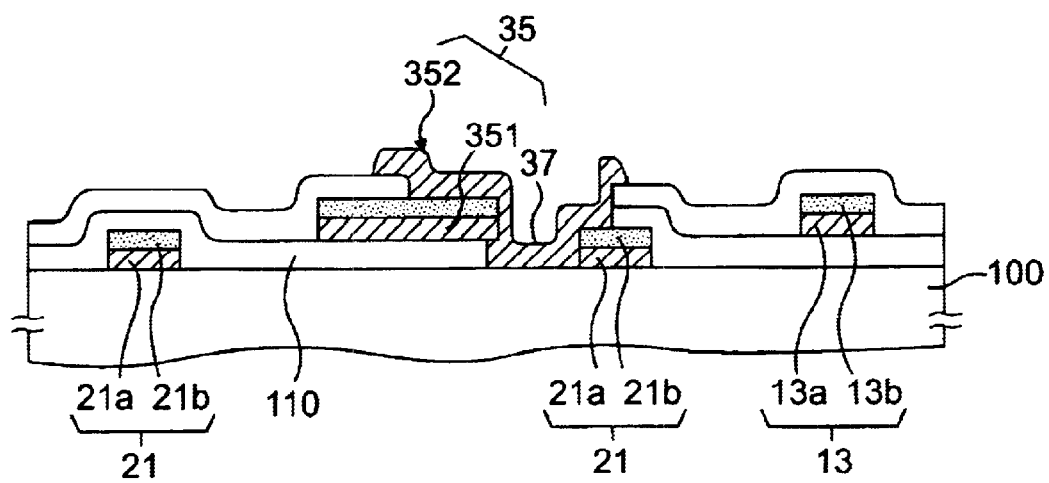
FIG. 5 is a cross-sectional view taken along the line V–V' in FIG. 4.

FIG. 5 is a cross-sectional view taken along the line V–V' in FIG. 4.

Referring to FIGS. 3, 4 and 5, each common shorting bar 31, 33, or 35 comprises a first common voltage line layer 351, and a second common voltage line layer 352 that is formed on the first common voltage line layer 351. The second common voltage line layer 352 has a plurality of contact plugs 37 that electrically connects the first and/or second common voltage line layer 351 and/or 352 to the common electrodes 20. The contact plugs 37 are positioned at a center portion and both ends of each common electrode 20 to which common shorting bars 31, 33, 35 are connected.

A preferred embodiment for manufacturing a liquid crystal display device in accordance with the present invention will now be explained.

FIG. 6A to FIG. 6E are flow diagrams showing the process steps of a method for manufacturing an in-plane switching type liquid crystal display device in accordance with the present invention, which are taken along the line V–V' in FIG. 4.

Figure 6A:
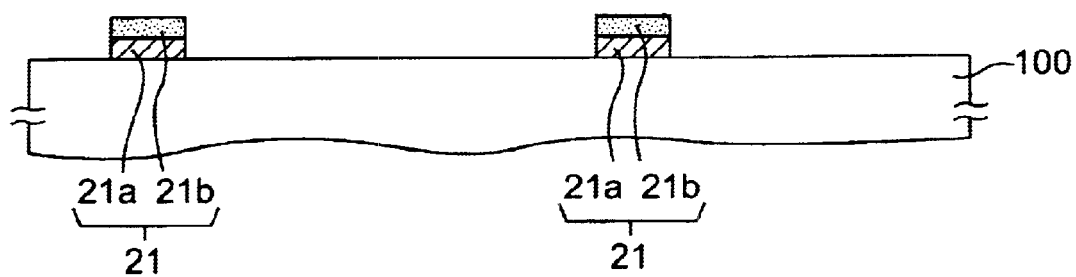
FIG. 6a to FIG. 6e are flow diagrams showing the process steps of a method for manufacturing an in-plane switching type liquid crystal display device in accordance with the present invention, which are taken along the line V–V' in FIG. 4.

Referring now to FIGS. 6A and 4, a first conductive layer is formed on a substrate 100. Then, a first conductive layer is patterned to form common electrodes 20 including three common electrode bars 21, 21' and 21" and two common electrode lines 23, 23' per pixel, and gate lines 40. Alternatively, a blocking layer can be formed on the substrate 100 before the first conductive layer is formed.

The first conductive layer is formed of a double layered structure, as shown in FIG. 6A. Preferably, the double layered structure is composed of a lower Cr layer 21a and an upper Al layer 21b. Alternatively, the double layered structure can be composed of a lower Cr layer and an upper Al-Nd alloy layer. Also, the first conductive layer can be formed of a sole layered structure composed of metal such as Al, Cr, or Al-Nd alloy.

The common electrodes 20 are arranged parallel to the gate lines 40. Each common electrode 20 has a ladder shape. A plurality of common electrode bars 21, 21' and 21" are connected in the transverse direction by common electrode lines 23 and 23'. As shown in FIG. 4, three common electrode bars 21, 21', 21" are disposed in a pixel to be exposed by one of apertures of a black matrix pattern (not shown) that covers the common electrode lines 23 and 23', connecting members 15 and 17 of a pixel electrode 10, the gate lines 40 and data lines 50 and 50'.

Figure 6B:
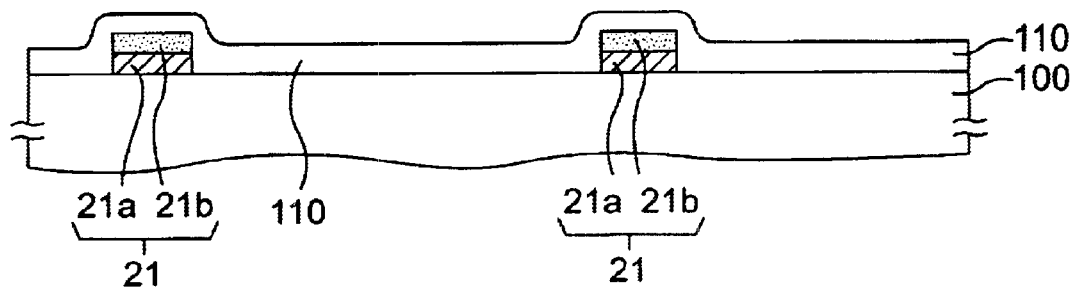

Referring to FIGS. 6B and 4, a gate insulating layer 110 is formed on the substrate 100 on which the common electrodes 20 including a plurality of common electrode bars 21, 21' and 21" and a plurality of common electrode lines 23 and 23' are formed. The gate insulating layer 110 is composed of a silicon nitride layer formed by a chemical vapor deposition process. Thereafter, an amorphous silicon layer is formed on the substrate 100 as a semiconductor layer to form channels of transistors. Then, a $N^+$ doped amorphous silicon layer is formed on the substrate 100 as an ohmic contact layer. Active areas 27 are formed by patterning these silicon layers. Preferably, semiconductor patterns 29 remain at areas where lines are crossed, in order to reduce the parasitic capacitance between lines, as shown in FIG. 4.

Figure 6C:
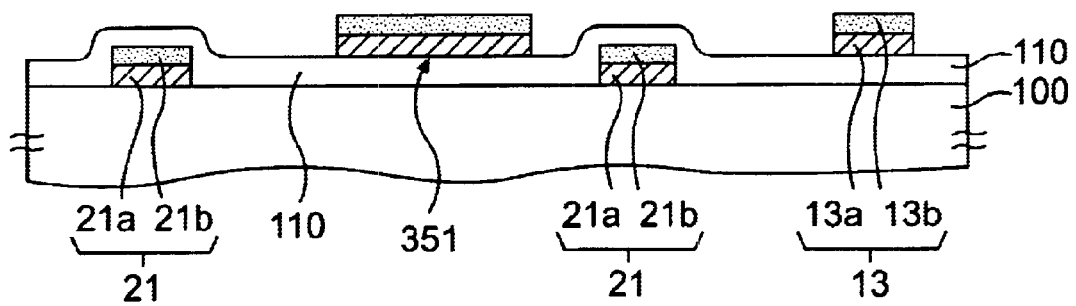

Referring to FIGS. 6C and 4, a second conductive layer is formed on the substrate 100 on which the active areas 27 are formed. The second conductive layer is formed of a double layered structure. Preferably, the double layer structure is composed of a lower Cr layer 13a and an upper Al layer 13b. Alternatively, the double layer structure can be composed of a lower Cr layer and an upper Al-Nd alloy layer. Thereafter, a drain and a source electrode 26, 28 of each transistor are formed at every pixel by patterning the second conductive layer. Also, pixel electrodes 10 connected to the drain electrode 26 are formed, as shown in FIG. 4. Each Pixel electrode 10 has two pixel electrode bars 13 and 13' aligned in the longitudinal direction in every pixel. The pixel electrode bars 13 and 13' are arranged parallel to the common electrode bars 21, 21' and 21", and each pixel electrode bar 13 or 13' is arranged alternately between two of the common electrode bars 21, 21' and 21". Upper and lower ends of the pixel electrode bars 13 and 13' are electrically connected by an upper and lower connecting member 15 and 17, respectively. The drain electrode 26 extends from the lower connecting member 17, whereas the source electrode 28 extends from the data line 50.

The drain and source electrodes 26, 28 are separated from each other at the active area 27 to form a channel of the transistor. In order to form the channel between the drain electrode 26 and the source electrode 28, the doped amorphous silicon layer along with the second conductive layer is patterned and removed.

Referring to FIGS. 3 and 4, a first common voltage line layer 351 of a common shorting bar 35 is formed in the longitudinal direction at a center portion of the pixel area on the substrate. Also, data lines 50 positioned at the right of the first common voltage line layer 351 are formed respectively at the right of corresponding pixels positioned at the right of the first common voltage line layer 351, and data lines 50' positioned at the left of the first common voltage line layer 351 are formed respectively at the left of corresponding pixels positioned at the left of the first common voltage line layer 351. The first common voltage line layer 351 arranged parallel to the data lines 50 and 50' is wider than the data lines 50 and 50' as long as it is within the limits of the black matrix pattern. Also, other first common voltage line layers composed of the same material as the data lines is formed in the longitudinal direction at both sides of the pixel area on the substrate in order to form common shorting bars 31 and 33.

Figure 6D:
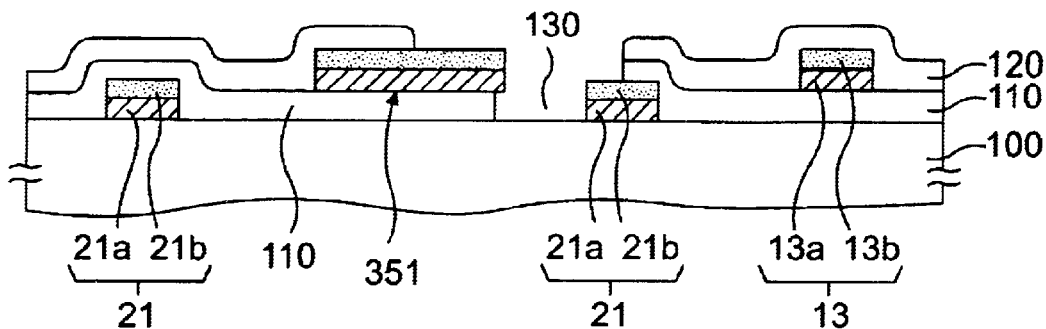

Referring to FIGS. 6D and 4, a protecting layer 120 is formed on the substrate 100 on which the drain and source electrodes 26 and 28, the pixel electrode 10, and the first common voltage line layer 351 are formed. The protecting layer is formed of an insulating layer, such as a silicon nitride layer. Thereafter, contact holes 130 are formed at a center portion of each common electrode 20 to which the first common voltage line layer 351 is to be electrically connected, by partially patterning the protecting layer 120 and the gate insulating layer 110. Accordingly, the center portion of each common electrode 20 and corresponding portion of the first common voltage line layers 351 are partially exposed by the contact holes 130, as shown in FIG. 6d. Also, other contact holes 130 are also formed at both ends of each common electrode 20, so that both ends of each common electrode 20 and corresponding portions of the first common voltage line layers 351 can be partially exposed thereby.

Figure 6E:
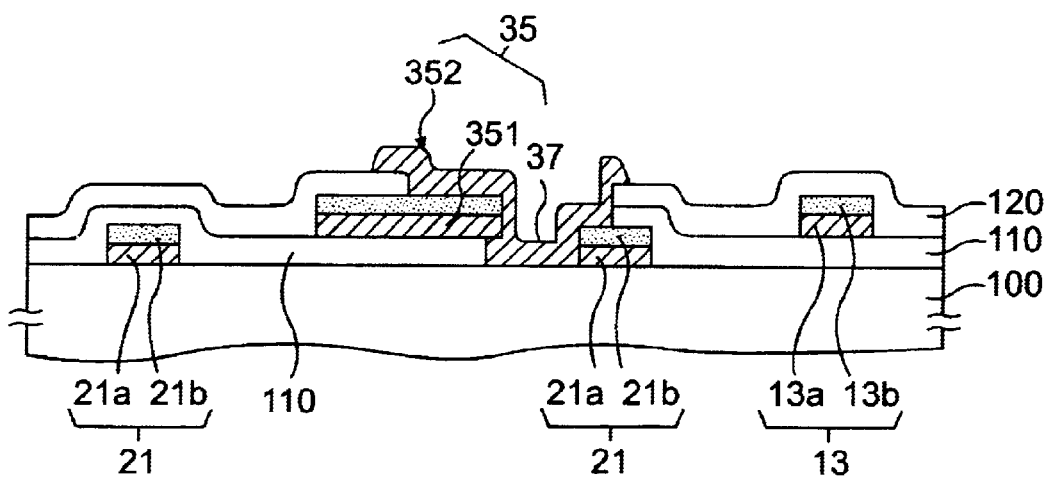

Referring to FIGS. 6E and 4, a third conductive layer is formed on the substrate 100. Then, a second common voltage line layer 352 is formed at the center portion of the pixel area by patterning the third conductive layer. Also, contact plugs 37 are formed in the contact holes 130 in order to electrically connect the first and second common voltage line layer 351, 352 with each common electrode 20. The contact plugs 37 are positioned at a center portion of each common electrode 20 to which common shorting bar 35 are connected.

Alternatively, without forming the second common voltage line layer 352 at the center portion of the pixel area, only contact plugs 37 can be formed in the contact holes 130 which are positioned at the center portion of each common electrode 20 in order to electrically connect the first common voltage line layer 351 to each common electrode 20.

Also, other second common voltage line layers 352 and contact plugs 37 are formed respectively at both sides of pixel area in order to form the common shorting bars 31 and 33. In the case, also, without forming the second common voltage line layers 352 at both sides of the pixel area, only the contact plugs 37 can be formed in the contact holes 130 positioned at both side portions of each common electrode 20 in order to electrically connect the first common voltage line layer 351 with each common electrode 20.

In the preferred embodiment of the invention, the common shorting bars 31,33 and 35 are formed of a double layered structure including the first and second common voltage line layers 351, 352, respectively. Particularly, it is preferable that the common shorting bar 35 positioned at the center portion of the pixel area is formed of the double layered structure including the first and second common voltage line layers 351 and 352 to reduce the line resistance since it has relatively small line width due to limits of the aperture ratio compared with the common shorting bars 31,33 positioned at both sides of the pixel area. However, if necessary, one of the first and second common voltage line layers 351 and 352 of the common shorting bars 31 and 33 as well as the common shorting bar 35 can be omitted. Also, it is preferable that the third conductive layer is formed of metal having relatively low resistivity.

At least one of both ends of each common shorting bar 31, 33 or 35 is connected with common voltage pad 60 of the source driving integrated circuit. Preferably, both ends of each common shorting bar 31, 33 or 35 are connected respectively with upper and lower common voltage pads 60 of the source driving integrated circuit to reduce voltage drops due to the line resistance of the common shorting bar itself. Also, each end of the common shorting bar 35 positioned at the center portion of the pixel area can be connected to two of common voltage pads 60 of the source driving integrated circuit. In the case, even though one of two common voltage pads 60 connected to one end of the common shorting bar 35 is abnormal, the common shorting bar 35 can receive common voltages, thereby improving reliance of the LCD.

As apparent from the foregoing description, it can be appreciated that the present invention provides an improved liquid crystal display device and a method for manufacturing the same that can prevent common voltage drop at each pixel of the pixel area, without an additional process and decrease of an aperture ratio, thereby improving the image quality of the LCD.

Also, the present invention provides an improved liquid crystal display device and a method for manufacturing the same that are adapted to use in a large size and high definition LCD.

In the drawings and specification, there has been disclosed typical preferred embodiment of the invention and, although specific terms are employed, they are used in a generic and descriptive sense only and not for purpose of limitation, the scope of the invention being set forth in the following claims.

What is claimed is:

1. A liquid crystal display device, comprising:
    a plurality of spaced apart gate lines disposed in a first direction in a pixel area having a plurality of pixels;
    a plurality of spaced apart data lines disposed in a second direction perpendicular to said first direction;
    a plurality of pixel electrodes disposed respectively in the pixel area, each of the pixels being confined to an area enclosed by adjacent gate lines and data lines;
    a plurality of common electrodes disposed in the pixel area; and
    a common electrode connector disposed at a center portion of the pixel area to supply common voltages to the common electrodes.

2. The liquid crystal display device according to claim 1, wherein said common electrode connector is disposed in the second direction.

3. The liquid crystal display device according to claim 1, further comprising a common electrode connector disposed in the second direction on at least one of both sides of the pixel area to supply common voltages to the common electrodes.

4. The liquid crystal display device according to claim 1, wherein at least one of both ends of said common electrode connector is connected to a common voltage pad of a source driving IC.

5. A method for manufacturing a liquid crystal display device, comprising the steps of:
    forming a first conductive layer on a substrate;
    forming gate lines and common electrode lines by patterning the first conductive layer;

forming a gate insulating layer on the substrate on which the gate lines and the common electrode lines are formed;

forming a semiconductor layer on the substrate on which the gate insulating layer is formed;

forming an active region by patterning the semiconductor layer;

forming a second conductive layer on the substrate on which the active region is formed;

forming a plurality of thin film transistors, each of which has a source electrode and a drain electrode, a pixel electrode connected to the drain electrode, and a data line connected to the source electrode by patterning the second conductive layer on the substrate;

forming a protecting layer on the substrate on which the data lines are formed;

forming contact holes to expose a center portion of each common electrode;

forming a third conductive layer on the substrate on which the contact holes are formed; and forming a common electrode connector parallel to the data lines at a center portion of the pixel area by patterning the third conductive layer, the common electrode connector being electrically connected with the center portion of each common electrode on which the contact holes are formed.

6. The method for manufacturing a liquid crystal display device according to claim 5, wherein the step of forming the active region further comprises forming a doped semiconductor layer on the substrate on which the semiconductor layer is formed, and the doped semiconductor layer is patterned with the semiconductor layer.

7. The method for manufacturing a liquid crystal display device according to claim 6, wherein the step of forming the thin film transistors further comprises separating the source electrodes from the drain electrodes by patterning the doped semiconductor layer along with the second conductive layer.

8. The method for manufacturing a liquid crystal display device according to claim 5, wherein the step for forming the data lines further comprises forming another common electrode connector of the same material as the data lines at the center portion of the pixel area.

9. The method for manufacturing a liquid crystal display device according to claim 8, wherein the step of forming the contact holes further comprises exposing portions of the common electrode connector of the same material as the data lines with which the center portion of each common electrode is to be electrically connected, and the step of forming the common electrode connector by patterning the third conductive layer includes making the center portion of each common electrode to be electrically connected to the portions of the common electrode connector of the same material as the data lines.

10. The method for manufacturing a liquid crystal display device according to claim 8, wherein the step of forming common electrode connector by patterning the third conductive layer further comprises forming at least one common electrode connector disposed parallel to the data lines on at least one of both sides of the pixel area.

11. The method for manufacturing a liquid crystal display device according to claim 10, wherein the step for forming the data lines further comprises forming at least common electrode connector composed of the same material as the data lines on at least one of both sides of the pixel area.

12. The method for manufacturing a liquid crystal display device according to claim 11, wherein the step of forming the contact holes includes exposing portions of at least common electrode connector of the same material as the data lines to which at least one of said both ends of each common electrode is to be electrically connected, and the step of forming common electrode connector by patterning the third conductive layer includes making at least one of both ends of each common electrode to be electrically connected to the portions of at least one common shorting bar of the same material as the data lines.

* * * * *

UNITED STATES PATENT AND TRADEMARK OFFICE
CERTIFICATE OF CORRECTION

PATENT NO. : 6,624,869 B2
DATED : September 23, 2003
INVENTOR(S) : Jung-Hee Lee

It is certified that error appears in the above-identified patent and that said Letters Patent is hereby corrected as shown below:

<u>Title page,</u>
Item [75], Inventor, change "Jung-Hoo Lee" to -- Jung-Hee Lee --.

Signed and Sealed this

Eleventh Day of November, 2003

JAMES E. ROGAN
*Director of the United States Patent and Trademark Office*